March 9, 1926.

W. E. GLASPEY 1,576,114

MACHINE FOR MAKING GLASS CONTAINERS

Filed Oct. 22, 1923    5 Sheets-Sheet 1

Fig. 1.

Inventor:
Warren E. Glaspey,
By Dyrenforth, Lee, Chritton & Wiles,
Attys.

March 9, 1926.

W. E. GLASPEY 1,576,114

MACHINE FOR MAKING GLASS CONTAINERS

Filed Oct. 22, 1923    5 Sheets-Sheet 2

Inventor:
Warren E. Glaspey,
By Dyrenforth, Lee, Chritton & Wiles
Attys.

March 9, 1926.

W. E. GLASPEY 1,576,114

MACHINE FOR MAKING GLASS CONTAINERS

Filed Oct. 22, 1923    5 Sheets-Sheet 3

Inventor.
Warren E. Glaspey,
By Dyrenforth, Lee, Chritton & Wiles,
Attys.

March 9, 1926. 1,576,114
W. E. GLASPEY
MACHINE FOR MAKING GLASS CONTAINERS
Filed Oct. 22, 1923 5 Sheets-Sheet 5

Fig. 8.

Inventor:
Warren E. Glaspey,

Patented Mar. 9, 1926.

1,576,114

UNITED STATES PATENT OFFICE.

WARREN E. GLASPEY, OF BRIDGETON, NEW JERSEY, ASSIGNOR TO SPRING STOPPER COMPANY, OF NEW YORK, N. Y., A CORPORATION OF DELAWARE.

MACHINE FOR MAKING GLASS CONTAINERS.

Application filed October 22, 1923. Serial No. 670,041.

*To all whom it may concern:*

Be it known that I, WARREN E. GLASPEY, a citizen of the United States, residing at Bridgeton, in the county of Cumberland and State of New Jersey, have invented new and useful Improvements in Machines for Making Glass Containers, of which the following is a specification.

The present invention relates particularly to the production of containers provided with internally threaded mouth portions, adapted to receive threaded stoppers, by means of a machine of the press and blow type.

The primary object of the invention is to adapt a machine of the press and blow type to the production of containers provided with internally threaded mouth portions; and the invention involves the combination with the mechanisms of a machine for pressing and blowing a container, of means cooperating with such mechanisms for producing internal threads in the mouths of the containers.

It may be stated preliminarily that in a machine of the general type referred to there are employed a rotatable carrier having a step-by-step movement of rotation; a series of neck rings, or neck molds mounted on the carrier and which are automatically opened and closed; a series of parison or blank molds which are raised and lowered at proper intervals and which cooperate with the neck rings in forming the parisons or blanks; a series of blow molds which cooperate with the neck rings in alternation with the parison molds to enable the parisons to be blown to the form of the finished containers; a press beneath which the neck rings and parison molds are brought, seriatim, to enable the blanks to be pressed; and a blowhead which cooperates with the neck rings and blow molds in the operation of blowing the blank to the form of the finished container.

In the preferred embodiment of the present invention which is illustrated in the accompanying drawings, the press-plunger has mounted thereon a cross-head which is adapted to be lowered onto the neck ring when a parison mold and the cooperating neck ring are brought beneath the plunger; and said cross-head has mounted therein an annular mandrel which embraces the tool-portion of the press-plunger, said mandrel having its tip-portion equipped with a thread which is adapted to mold a thread in the container-mouth and having its shank-portion equipped with a thread which works through a nut mounted on said cross-head. Also, the cross-head has mounted thereon gear mechanism serving to rotate the mandrel in either direction a predetermined number of revolutions; and the mandrel gear mechanism is driven in one direction and then in the other by means of a reversible gear mechanism mounted in the upper portion of the main frame of the machine and actuated by means of a suitable motor.

In the embodiment illustrated, A represents the base of the frame of the machine, from which rises the large stationary post or shaft A', about which the mold-carrier rotates, and from which rises, also, the end posts or shafts $A^2$, which, in conjunction with the post A', support the large top frame member $A^3$; B, a rotatable carrier adapted to be actuated in a step-by-step movement and which comprises an upper table or platform B', an intermediate platform B² and a lower platform B³, these platforms being rigidly united together; C, a series of neck rings, or neck molds, mounted on the platform B' and adapted to be opened and closed at proper intervals by means of a central cam C' mounted on the post A' and connections C² (Fig. 2) between the cam C' and the sections of the neck rings; D, a series of blow molds mounted on the intermediate table B² and adapted to be opened and closed at suitable intervals by means of a cam D' mounted on the column A' and connections D² (Fig. 4) between the mold sections and the cam; E, a series of parison molds, or blank molds, which, in their lowered position, occupy the space between the intermediate table B² and the lower table B³, but which are adapted to be elevated into cooperative relation with the neck rings, the blow mold being open to admit the parison molds while the parison molds are in the elevated position; E', stems or shanks with which the parison molds are equipped and which work through the lower table B³, the stems E' being brought, in turn, over a vertical lift mounted on the base of the machine and which appears at the upper portion of Fig. 3, whereby the parison mold will be lifted into cooperation with the neck ring before the carrier rotates to carry the parison mold to the glass-charging position; F, a press-cylinder disposed over the path of the molds and shown as formed integrally with the large frame member A³; F', a piston mounted in the press-cylinder and equipped with a depending stem or press-plunger F², whose lower end is equipped with the pressing tool, or mandrel F³; G, a cross-head, or annular plate (Figs. 1, 5 and 7) whose lower surface is provided with a boss adapted to fit into a recess with which the neck ring is provided, said crosshead being equipped with upwardly extending guide rods G' which work through perforations in a plate or bracket G² which is firmly secured to the plunger F², these guide rods being provided at their upper ends with heads, so that they will be lifted by the member G² in the final portion of the upstroke of the plunger F², thereby lifting the cross-head G; G³, coil springs encircling the guide rods and confined between the member G² and the cross-head G; H, an annular mandrel embracing the pressing tool F³ and working freely through a central perforation 1 with which the cross-head G is provided, said annular mandrel being provided at its tip-portion with a thread 2, adapted to mold a thread in the mouth of the container, and being provided on its shank with a thread 2ª of the same pitch; I, a nut fixedly secured to the upper side of the cross-head G and engaging the thread 2ª; J, a gear case fixedly mounted on the cross-head G and having journaled therein a mandrel gear J', which is secured to the upper end of the annular mandrel H by an adapting ring J²; J³, an annular gear meshing with the gear J'; J⁴, a frictionally driven gear meshing with the gear J³, the gear J' being driven through the medium of the friction clutch device J⁵; K, a vertical drive shaft having splined connection with the clutch device J⁵, so that the gear case J and its contents may be lifted without interfering with the connection between the shaft K and the clutch J⁵; L, a bracket supported on the pedestal A' and having mounted thereon an electric motor L' and a gear case L² containing reversing gear mechanism L³ (Fig. 8), said reversing gear mechanism being operated through the medium of a clutch L⁴ which is adapted to be shifted by means of a lever L⁵; M, a pneumatic cylinder equipped with a piston M', serving to actuate the lever L⁵; N, (Figs. 1 and 8) a timing cylinder fitted with a piston N'; O, a valve casing containing a valve O' which controls the air pressure to the cylinders F and M, the valve O' being controlled by the timing cylinder and its piston; P, a bracket arm (Figs. 1 and 7) supported on the standard A' and serving to support a cylinder P' which contains a piston (not shown) which, through the medium of a stem P², serves to actuate the blow-head P³ which is adapted to cooperate, in the usual way, with the blow molds, in turn, Q, (Figs. 1 and 3) pneumatic mechanism for releasing the latches Q', which hold the parison molds in their elevated position, said mechanism Q also serving to lower the parison molds, in turn; R, (Fig. 3) a pneumatic lift for the parison molds; S, (Figs. 1 and 3) a carrier-actuating sleeve journaled on the base-portion of the pedestal A', equipped with a carrier-actuating arm S', the sleeve being itself actuated through the medium of a short arm S²; T, a cylinder containing a piston (not shown) which serves to actuate a piston rod T', which is linked to the actuating arm S², said piston rod T' extending into a dash-pot T²; U, pneumatic carrier-locking mechanism which serves to lock the mold-carrier B and also to retract the carrier-actuating pin with which the arm S' is equipped, it being understood that the arm S' has an arc of movement corresponding with the angular movement of the carrier B; V, a pneumatic device equipped with a piston-like valve V' and controlling the mechanism Q; W, (Figs. 1, 3 and 8) the casing of a main control valve W'; X, a valve in a control pipe X', the valve X being opened when the piston F' reaches the top of the stroke by means of an arm X² carried by the press-plunger F²; Y, (Figs. 6 and 8) a check valve connected with the upper end of the press-cylinder F; and Z, a check valve connected with the upper end of the timing cylinder N.

In practice, a pneumatic locking device for locking the blow molds while in the blowing position is employed. However, such locking device is not illustrated, as it is well understood in the art. Also, suitable vents or check valves are employed in connection with various cylinders, where necessary, or where usual in the art, but are not illustrated in the drawings.

The frame A of the machine may be of any suitable construction, the form illustrated being well adapted to the purpose. The carrier B, the mounting of the neck rings C thereon, the mounting of the blow molds D, and the mounting of the parison molds E are well understood in the art; also, the means for closing and opening the neck rings and blow molds is well understood; also, the means for raising and lowering the parison molds is known in the art. Furthermore, the means for actuating and locking the mold-carrier is well understood in the art. Therefore, only such illustration and description of the known mechanism as will facilitate the understanding of the present invention, will be given.

Figure 5:
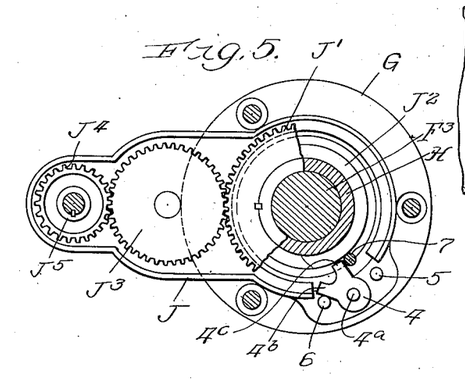
Fig. 5, a section taken as indicated at line 5—5 of Fig. 7 and showing means mounted on the cross-head for effecting rotation of the annular mandrel.
Figure 6:
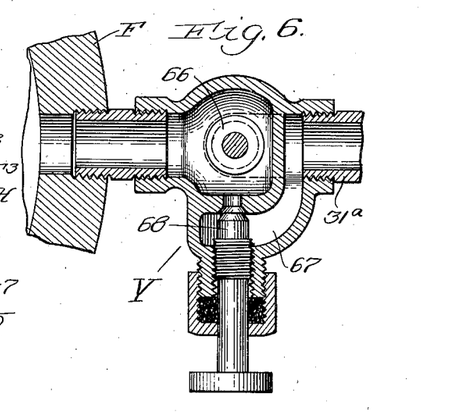
Fig. 6, an enlarged sectional detailed view of the check valve employed at the top of the press-cylinder and taken as indicated at line 6—6 of Fig. 8.
Figure 7:
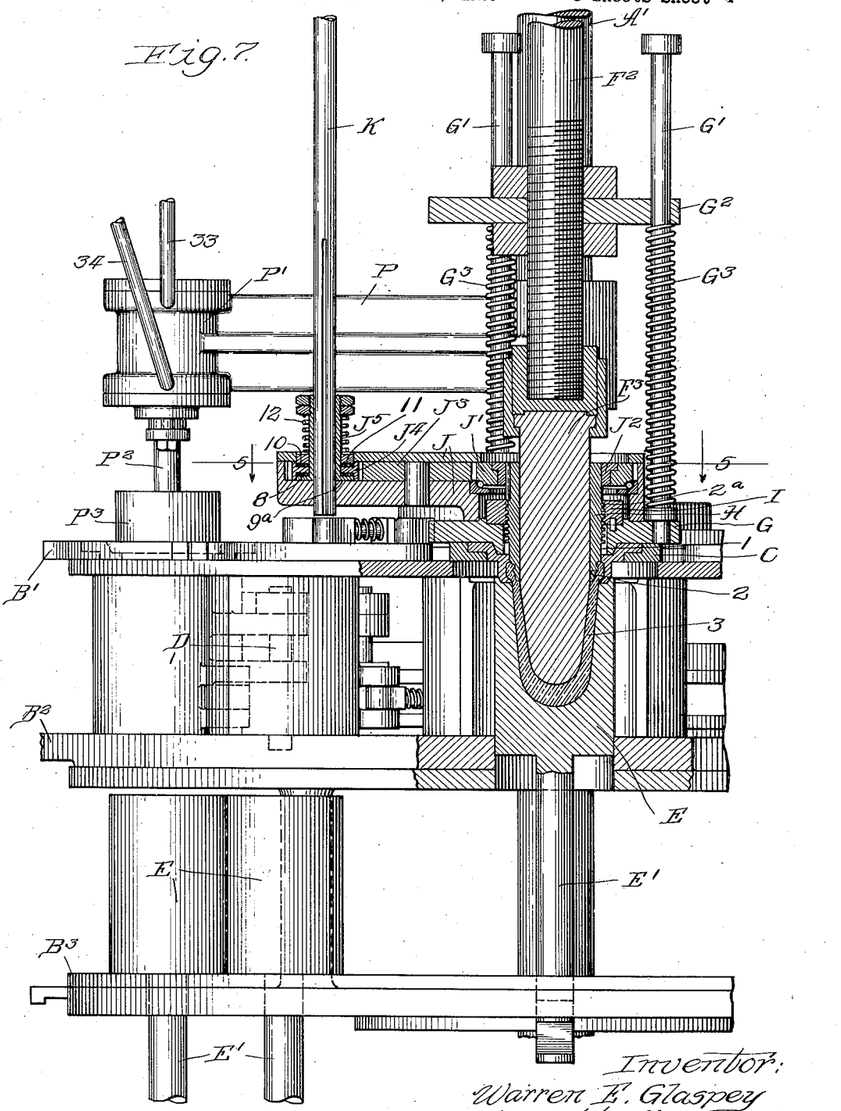
Fig. 7, a broken sectional elevational view taken as indicated at line 7—7 of Fig. 2.

Referring to Fig. 7, the blank or parison may be designated 3. Referring to the same Figure in connection with Fig. 5, it may be stated that the gear mechanism which is mounted on the cross-head G is designed to rotate the tubular mandrel H two turns clockwise during the descent of the plunger F² and two turns counter-clockwise during the upstroke of the plunger F², but before the cross-head G starts to rise. The tip of the tubular mandrel is provided with threads adapted to form two threads in the mouth of the container-blank. The clutch J⁵ permits slippage after the mandrel H has made the required two turns. For the purpose of limiting the number of revolutions of the tubular mandrel H, the cross-head has mounted thereon, as shown in Fig. 5, a movable stop or dog 4, which is supported on a pivot 4ᵃ and which is equipped with two teeth, 4ᵇ and 4ᶜ. The movement of the stop 4 is limited by studs 5 and 6 mounted on the cross-head G. The stop 4 is swung on its pivot by means of a stud 7, which depends from the mandrel gear J′. When the mandrel gear rotates clockwise, as viewed in Fig. 5, the stud 7 engages the tooth 4ᵇ at the end of one revolution, and effects partial movement of the stop 4; and at the end of the next revolution the stud 7 engages the tooth 4ᶜ, thus completing the movement of the stop 4 to the position shown in Fig. 5. When the gear J′ is rotated counter-clockwise, a reverse movement of the stop 4 takes place. Thus, after the gear J′ has completed two revolutions in either direction, it will be held against further rotation, while the clutch J⁵ slips with relation to the pinion J⁴.

The gear J⁴ has its disc-portion 8 provided with a large central perforation through which extends an elongated hub 9 of a lower metal disc 9ᵃ. Flanking the disc-portion 8 of the gear J⁴ are friction washers 10. Above the uppermost friction washer 10 is located a metal washer 11, on which bears a coil spring 12, which is adjustable by means of nuts 13 secured on the upper end of the hub 9. By these means, the friction between the clutch and the disc 8 of the gear J⁴ may be regulated.

The upper end of the actuating shaft K is equipped (Fig. 8) with beveled pinion 14 which meshes with a pinion 15 formed integrally with a gear 16 which is driven by a pinion 17 mounted on a shaft 18. The shaft 18 is actuated in either direction from the counter-shaft which is equipped with the clutch L⁴, said counter-shaft itself being actuated by a gear 19 driven by a pinion 20 which is mounted on the motor shaft 21. Without further description, it will be readily understood that the clutch of the reversing gear mechanism is controlled by the movements of the lever L⁵. In the position shown in Fig. 8, the clutch is in the neutral position. When it is shifted to the right, it causes a direct drive to be communicated to the shaft 18; and when it is shifted to the left, it causes the shaft 18 to rotate in a reverse direction. As has been indicated, the lever L⁵ is controlled by the piston N′, whose stem 22 is connected with the upper end of the lever.

Figure 8:
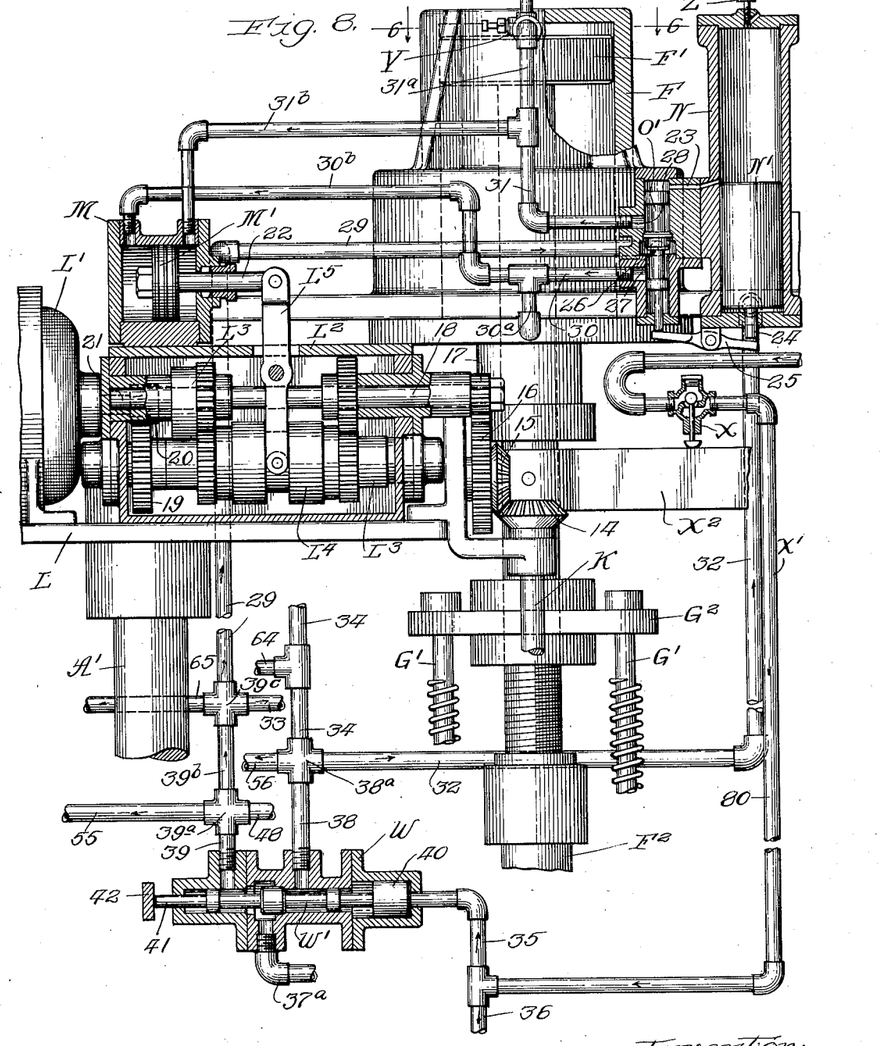
Fig. 8, a broken elevational view, partly in section, taken in a plane corresponding with Fig. 1, and showing details of the devices at the upper portion of the machine.

The timing cylinder N is provided at one side near its center with an outlet passage 23 which leads to the upper end of the valve cylinder O. When the piston N′ is at the upper end of its traverse, air is admitted from beneath the piston through the passage 23 to the cylinder O to depress the valve O′. The piston N′ serves to actuate a short plunger 24 which serves to actuate a valve control lever 25 which is pivotally mounted and which has one end disposed beneath the path of the valve O′.

The cylinder O has a central inlet orifice 26, which is adapted to be connected through the valve O′ with a lower outlet orifice 27 when the valve O′ is in the lowered position, and with an upper outlet orifice 28 when the valve is in the elevated position. The inlet orifice 26 has in communication therewith a pipe 29 which leads thereto from the main control valve casing W. The lower outlet orifice 27 has connected therewith an outlet pipe 30, which has one branch 30ᵃ leading to the bottom of the press-cylinder 2, and another branch 30ᵇ leading to the left hand end of the cylinder M, as viewed in Fig. 8. The upper outlet orifice 28 has leading therefrom an outlet pipe 31 which has a branch 31ª communicating with the upper end of the press-cylinder F through the medium of the valve Y, and another branch 31ᵇ which leads to the right hand end of the cylinder M as viewed in Fig. 8.

The timing cylinder N has communicating with its lower end an inlet pipe 32 which leads thereto from the casing W of the main control valve.

The blow-head cylinder P' has communicating with its upper end a pipe 33, and has communicating with its lower end a pipe 34. These pipes lead to the cylinder P from the cylinder W of the main control valve. These connections will best be followed with reference to Figs. 3 and 8.

Figure 3:
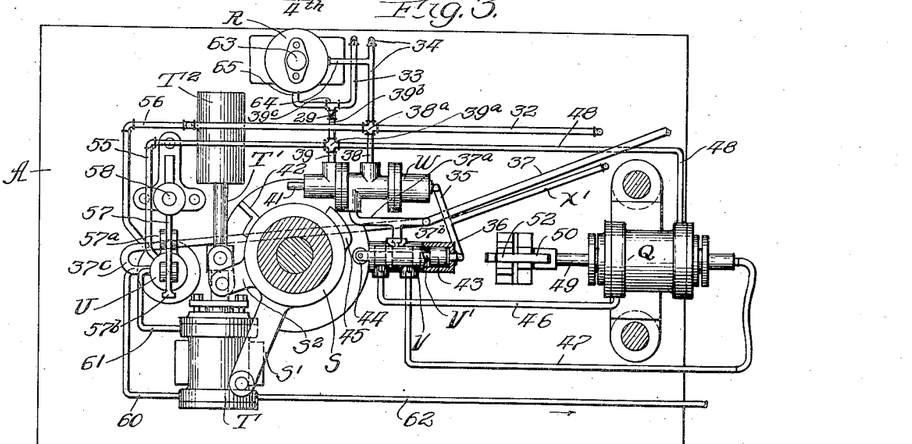
Fig. 3, a plan sectional view taken as indicated at line 3—3 of Fig. 1.
Figure 4:
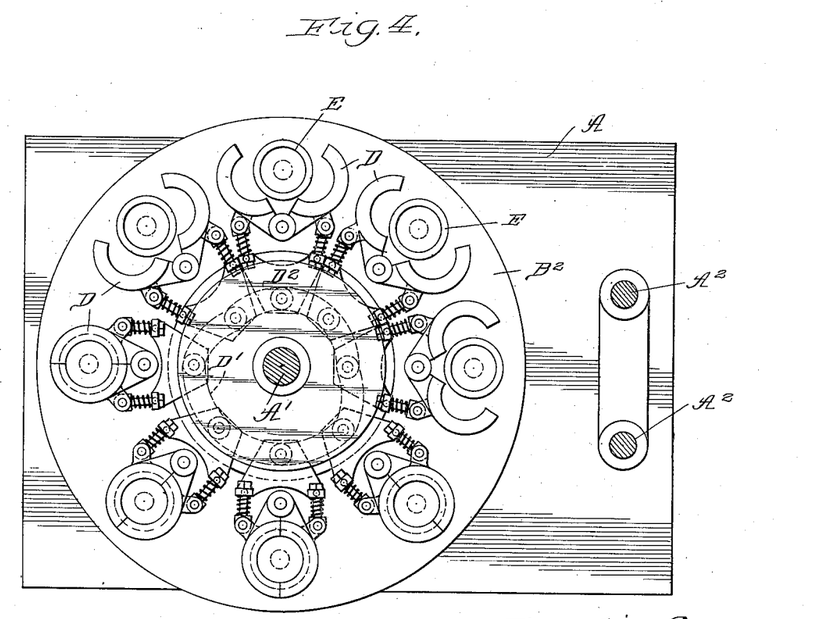
Fig. 4, a plan sectional view taken as indicated at line 4—4 of Fig. 1, this view being below the table or platform of the carrier which supports the neck rings.

The control pipe X' has, as shown in Fig. 3, a branch 35 communicating with one end of the casing W of the main control valve, and a branch 36 communicating with one end of the casing V of the valve V'.

A main air supply line 37 (Fig. 3) supplies working pressure to the various lines, being distributed through the valves W' and V'. The pipe 37 has one branch 37ª communicating with the central portion of the valve casing W, and has another branch 37ᵇ communicating with the intermediate portion of the valve casing V.

The valve casing W has an outlet pipe 38 equipped with a fitting 38ª with which the pipes 32 and 34 connect. The valve casing W has a second outlet pipe 39 equipped with a fitting 39ª, from which extends the pipe 39ᵇ which communicates, through a fitting 39ᶜ with the pipes 33 and 29.

The valve W', as appears from Fig. 8, is so constructed that it will throw the branch 37ª of the main air supply pipe into communication with the outlet pipe 38 when the valve is at the left hand end of its traverse, and will throw the branch 37ª into communication with the outlet pipe 39 when the valve is at the right hand end of its traverse, or in the position shown in Fig. 8. The valve has its right hand end equipped with a piston 40 which serves to move the valve to the left when air is admitted from the control pipe X' through the branch 35. The valve has at the other end a projecting stem 41 which is adapted to be struck by a member 42 (Figs. 3 and 8) when the carrier-actuating member S is turned in the operation of advancing the carrier a step.

In like manner, the valve V' is provided at one end with a piston 43 which serves to move the valve to the left as viewed in Fig. 3 when air is admitted from the control pipe X' through the branch 36; and the valve V' is provided with a projecting stem 44 which is adapted to be actuated by a cam 45 on the carrier-actuator S when the actuator operates to advance the table.

The valve V' controls the passage of air pressure from the branch pipe 37ᵇ through pipes 46 and 47 which lead to the opposite ends of the cylinder of the pneumatic mechanism Q. An additional pipe 48 leads from the fitting 39ª to the right hand end of the cylinder of the mechanism Q as shown in Fig. 3.

The pneumatic mechanism Q need not be described fully in detail. It may be stated, however, with reference to Figs. 1 and 3 that the cylinder of the mechanism is fitted with a piston (not shown) having a stem 49 with which is connected, by a pivot 49ª, a bell-crank lever 50, one arm of which is adapted to engage and retract the parison stem latches Q', in turn. The other arm of the bell-crank is connected with links 51, one of which is connected with a lever 52 which is pivotally supported at 53. The free end of the lever 52 is adapted to engage in notch 54 in the lower end of the stem of the parison mold, so that when the piston rod 49 is moved to the right from the position shown in Fig. 1, the latch Q' will be disengaged from the stem E', and the parison mold will be simultaneously lowered. The exact details of the mechanism Q and mode of operation are unimportant, and are, moreover, well understood in the art.

From the valve casing W air pressure is transmitted through the pipe 39 and fitting 39ª to a pipe 55 which leads to the top of the carrier-locking cylinder U. Also, from the same valve casing W air pressure is taken through the pipe 38 and fitting 38ª to a pipe 56 which extends to the bottom of the cylinder U.

The cylinder U contains a piston (not shown), which is adapted to actuate a horizontally disposed lever 57, supported on a pivot 57ª. One end of the lever 57 engages the lock pin 58 which is adapted to engage holes or sockets with which the lower table B³ of the mold-carrier is provided. The other end 57ᵇ of the lever is adapted to engage the flange on the lower end of the carrier-actuating pin 59 with which the actuating arm S' is equipped. In the position shown in Fig. 1, the actuator S has returned to its normal position of rest and engaged a fresh notch or hole in the table B³. When the carrier is again actuated, the locking pin 58 is first withdrawn by the lever 57, and this places the extremity 57ᵇ in position to engage the upper side of the flange of the table-actuating pin 59 at the end of the advance movement of the actuator. When the carrier comes to rest, the lever 57 operates to restore the locking pin 58 to the locking position and depresses the carrier-actuating pin 59, so that the actuator will be free to return to its normal position.

The piston in the cylinder U serves, in the well-known manner, as a valve to control the passage of the air pressure through the cylinder U to the carrier-actuating cylinder T. The pipes 55 and 56 control the movements of the piston in the cylinder U. The main pressure supply pipe 37 is provided with an extension or branch 37$^c$ which leads to the cylinder U. Pressure from this branch 37$^c$ is adapted to be communicated through a pipe 60 to one end of the cylinder T, and through a pipe 61 to the other end of said cylinder, the piston in the cylinder U serving, in a well-known manner, to connect the branch pipe 37$^c$ with first one and then the other of the pipes 60 and 61, so that the carrier actuator S will be advanced and then retracted at proper times.

Leading from the cylinder T is a pipe 62 whose purpose will be described later.

The parison mold lift R comprises a cylinder in which is located a piston (not shown) which has a stem 63 which is adapted to rise beneath the parison mold stems, in turn, and lift the parison mold. The pressure is supplied to the top of the cylinder of the parison mold lift by means of a pipe 64 which branches from the pipe 34; and pressure is suplied to the bottom of said cylinder through a pipe 65 which branches from the fitting 39$^c$.

Figure 2:
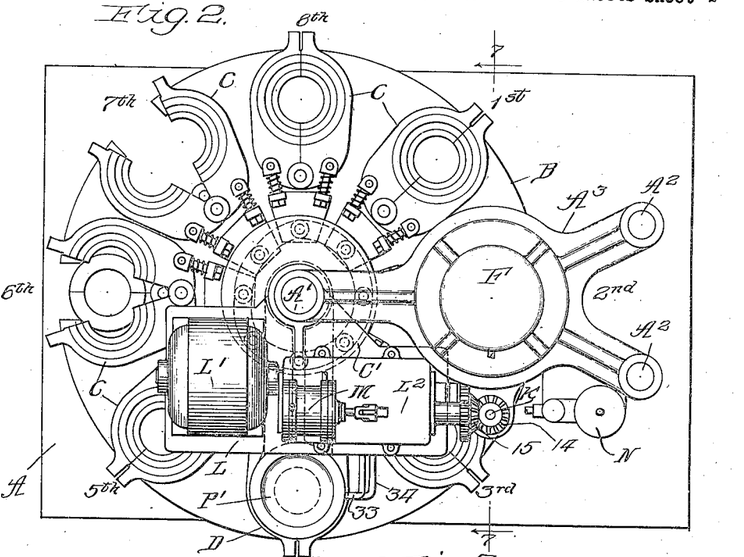
Fig. 2, a plan view of the machine.

The operation of the machine will be readily understood by those skilled in the art. Assuming working pressure to be supplied to the main pressure supply pipe 37 from any suitable source, and assuming the press-piston F' to be at the upper end of its stroke, so that the valve X in the control pipe X' is open, a supply of air through the control pipe X' will start the cycle of operations. Referring to Fig. 2, the various positions of the molds, whch may be termed stations, are numbered from 1st to 8th, inclusive. At the 8th station, the neck ring or neck mold C has resumed the closed position, and the parison mold has been lifted by the pneumatic lift R. At the next station, the station marked 1st, the glass will be introduced. At the 2nd station, the press will operate to form the parison and at the 4th station the blowing operation is performed.

When an automatic feeder is employed to supply glass to the parison molds, the control of the air supply to the control pipe X' may be effected in any suitable manner. When a gatherer introduces the charge of molten glass into the parison mold, it is usual to employ a shears (not shown) for cutting off the glass. Usually, the shears is automatically operated by a pneumatic mechanism and is set in operation by the gatherer who, after introducing the glass, operates a trip, which admits pressure to the operating mechanism of the shears. This operating mechanism controls the passage of air to the control pipe X'. During the cycle of operations, when the table actuator S operates to advance the table, the piston in the cylinder T uncovers the port which supplies the pipe 62, thus permitting pressure to pass through the pipe 62 and restore the shears-operating mechanism to its initial condition, cutting off the air supply through the control pipe X'.

Whatever may be the mode of supplying pressure to the control pipe X', the effect is to shift the valves W' and V', to the left, as viewed in Figs. 3 and 8. At this time, the press-plunger F' is at the upper end of its cylinder, and the valve X is held open by the arm X$^2$. When the valve W' moves to the left, it causes pressure to be admitted from the branch 37$^a$ of the main pressure pipe 37 to the pipe 38. This supplies pressure through the pipe 32 to the bottom of the timing cylinder N, through the pipe 34 to the bottom of the blow-head cylinder P', thus lifting the blow-head P$^3$, through the pipe 64 to the top of the parison mold lift cylinder R, and through the pipe 56 to the bottom of the cylinder U which serves to withdraw the locking pin 58 from the mold-carrier. Thus, the timing piston N' rises, and eventually admits pressure through the passage 23 to the top of the cylinder O, depressing the valve O'; also, the blow-head lifts; also, the parison mold lift drops; and, also, the carrier lock is released, and the carrier is advanced one step. At the end of the advance movement of the carrier, the lug 42 on the actuator S strikes the valve stem 41 and returns the valve W' to its original position, which is shown in Fig. 8. This places the branch 37$^a$ of the main pressure supply pipe 37 in communication with the outlet pipe 39 of the valve casing W, and thus the effect is to return the carrier lock to the locking position, lower the blow-head to operative position and raise the parison mold lift, thus elevating a fresh parison mold. Also, the effect is to admit pressure through the pipe 29 to the central portion of the valve cylinder O, and, bearing in mind that the valve O' has now been lowered, pressure will pass from the pipe 29 through the valve casing, thence through the pipe 31, and from the pipe 31 through the branches 31$^a$ and 31$^b$, causing the press-piston F' to descend and causing the piston N' to shift the clutch L$^4$ so that the motor will actuate the shaft 18 in the direction to cause the vertical shaft to turn the tubular mandrel H clockwise and thus lower it to the operative position. In the mean time, the press-piston F$^2$ descends, and, bearing in mind that the cross-head G, which has lost motion connection with the bracket G$^2$ carried by the press-piston, is in its lowered position with reference to the bracket G$^2$, the cross-head G will assume its proper position with reference to the ring mold; and finally, the pressing tool F³ descending to its lowest position in the parison mold, will press the glass to form the parison, at the same time causing the internal threads in the mouth of the parison to be formed.

Bearing in mind that the pressure supply to the pipe 32 was cut off by the return of the valve W' to the right hand position shown in Fig. 8, the timing piston N' falls, its time of descent being regulated by the valve Z at the upper end of the timing cylinder. This valve Z operates to admit air more or less slowly from the external atmosphere, depending upon the rate of descent which is desired for the piston N'. When the piston N' reached the lower end of its traverse, the stem 24 operated the lever 25, thus lifting the valve O'. Thus, the pressure pipe 29 was allowed to supply pressure through the valve casing O to the outlet pipe 30, and thence through the branches 30ᵃ and 30ᵇ to the lower end of the cylinder F and to the left hand end of the cylinder M respectively. By this means, the piston F' is caused to rise and the shaft 18 of the gear mechanism L³ is caused to rotate in a reverse direction, thereby elevating the tubular mandrel H with reference to the cross-head G. That is, the tubular mandrel is unscrewed from the glass thread in the parison mold. It will be borne in mind that the unscrewing of the tubular mandrel occurs before the cross-head G starts to rise, by reason of the fact that the cross-head dwells for a short period in its lowered position while the bracket G² on the press-piston F² rises to engage the flanges at the upper ends of the guide members G'. It may be added also that the return of the piston F' to its elevated position is suitably retarded by means of the check valve Y, illustrated in Fig. 6, this device being equipped with the self-closing valve 66, which opens to admit air freely to the top of the cylinder, but which closes when air is being expelled from the top of the cylinder. Thus, when air is being expelled from the top of the cylinder, it passes under control through a by-pass 67 regulated by an adjustable valve 68.

When the piston F' reaches the upper end of its stroke, the valve X is again opened, so that the control pipe X' is again ready to receive a fresh impulse of air to again operate the control valves W' and V'. It will be understood, of course, that while the blank is being pressed at one station, the blowing operation is performed at another station. Also, it may be added that before the table is advanced, the pneumatic mechanism Q operates at the second station to lower the parison mold, which has now served its function, so that the parison is left hanging from the neck mold and ready to be embraced by the blow mold. The blow mold closes about the parison as the mold moves to the 3rd station; and the blowing operation is performed at the 4th station. In the machine as illustrated, the neck ring opens during the passage from the 5th station to the 6th station, leaving the container held by the blow mold. Finally, the blow mold opens in approaching the 7th station, this being the point of discharge of the blown container.

Figure 1:
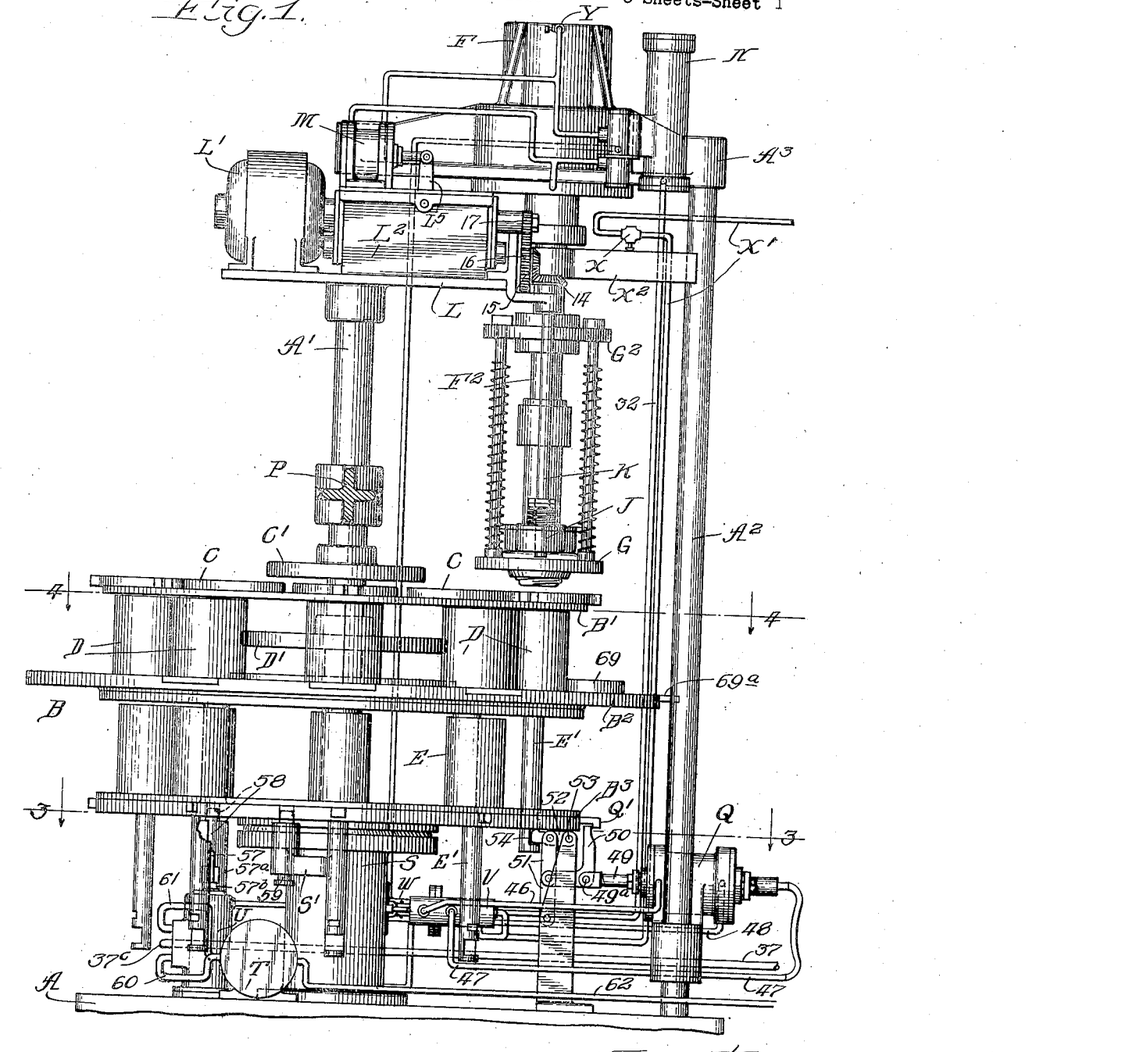
Fig. 1 represents an elevational view of a machine embodying the invention, this view showing the press-plunger some distance at the right of the main central post about which the mold-carrier rotates.

In practice, it is necessary to provide a bottom for the blow mold. In Fig. 1, a blow mold bottom 69 is shown, mounted on a slide 69ᵃ. Any suitable or usual means (not shown) for moving the blow mold bottom to its operative position may be employed.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent, is:

1. In a machine of the character set forth, the combination with a reciprocable press-plunger equipped with a pressing tool, of an independently movable cross head, a nut mounted thereon, an annular mandrel receiving said tool and having a threaded shank working through said nut and having a thread-equipped tip, gear mechanism mounted on said cross-head and adapted to rotate said mandrel, said gear mechanism being equipped with means for limiting the number of rotations, a clutch associated with said gear mechanism, a driving shaft having splined connection with said clutch, and reversing gear mechanism serving to actuate said shaft in either direction.

2. In combination, a rotatable mold-carrier, means for actuating the same step-by-step, neck rings mounted on said carrier, means for opening and closing said neck rings, vertically reciprocable parison molds coacting with said neck rings, means for raising and lowering said parison molds, blow molds coacting with said neck rings in alternation with said parison molds, means for closing and opening said blow molds, a press-plunger beneath which said parison molds are brought seriatum at a pressing station, means for actuating said plunger, an annular mandrel receiving said press-plunger and having a threaded shank and a thread-equipped tip, a movable cross-head, means for causing the cross-head to be raised and lowered, a nut fixed to said cross-head, and means operating at said station for rotating said mandrel in either direction a predetermined number of rotations 3. In combination, a main frame, a rotatable carrier, a series of parison molds mouted on said carrier, means for elevating and lowering said parison molds, a series of neck rings mounted on said carrier, means for opening and closing the neck rings, a series of blow molds mounted on said carrier and cooperating with said neck rings alternately with the parison molds, means for opening and closing said blow-molds, a press-plunger equipped with a pressing tool for forming the blanks in the parison molds, an annular mandrel through which said tool works and which is provided with an externally threaded tip and with a threaded shank, a nut engaging said threaded shank, a vertically movable cross-head carrying said nut, means for raising and lowering said cross-head, mandrel-rotating means mounted on said cross-head and equipped with means for limiting the number of rotations of said mandrel, and reversing gear mechanism mounted on said main frame and serving to actuate in either direction said mandrel-rotating means.

4. In means of the character set forth, the combination with a press-plunger of a machine of the press and blow type, of a vertically movable cross-head carried by said plunger, a nut mounted thereon, an annular mandrel receiving the plunger and having a threaded shank engaging said nut and having an externally threaded tip, mandrel-rotating means mounted on said cross-head, and reversing gear mechanism adapted to actuate said mandrel-rotating means in both directions at a single station.

5. In a machine of the character set forth, the combination of a rotary carrier, a series of neck molds mounted on said carrier, a series of parison molds and a series of blow molds associated with said neck molds and adapted to co-act alternately with said neck molds, means for actuating said carrier periodically, means for operating said molds, a mandrel disposed above the path of said neck molds and equipped with a thread-equipped tip co-acting with said neck molds, in turn, and equipped with a threaded shank, a head carrying a nut engaging said threaded shank, means for raising and lowering said head, a vertical shaft, means for rotating said shaft in either direction, and reversible gear connection between said shaft and said mandrel.

WARREN E. GLASPEY.